Sept. 17, 1968  IKUO TANAKA  3,402,125
METHOD FOR TREATING ORGANIC WASTE WATER WITH ACTIVATED SLUDGE
Filed April 26, 1967
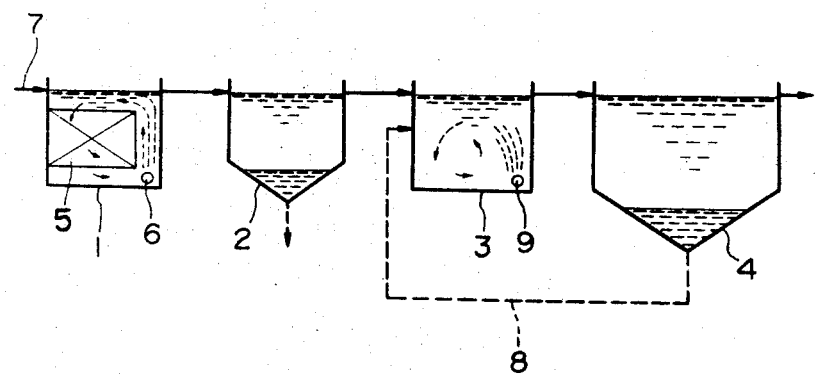
INVENTOR.
IKUO TANAKA
BY
Woodhams, Blanchard & Flynn
ATTORNEYS

United States Patent Office 3,402,125
Patented Sept. 17, 1968

3,402,125
METHOD FOR TREATING ORGANIC WASTE WATER WITH ACTIVATED SLUDGE
Ikuo Tanaka, Kanagawa-ken, Japan, assignor to Kurita Industrial Co., Ltd., Tokohama-shi, Kanagawa-ken, Japan, a corporation of Japan
Filed Apr. 26, 1967, Ser. No. 633,786
Claims priority, application Japan, Apr. 30, 1966, 41/27,465
3 Claims. (Cl. 210—7)

ABSTRACT OF THE DISCLOSURE

In treating organic waste water with activated sludge, bulking of said sludge due to the nature of the waste water to be treated can be controlled by the employment of the novel two-stage treatment comprising treating the waste water first by the "fixed activated sludge process" using a contact aeration tank which contains a multitude of net layers therein and then treating the resulting waste water by the "usual activated sludge process" which is to perform aeration of this latter waste water with some of the activated sludge recycled from the final settling tank while preventing recycling of any of the activated sludge to the contact aeration tank.

BACKGROUND OF THE INVENTION

Field of the invention

The present invention relates to an improvement in the so-called activated sludge process, and more particularly to an improved method for biochemically treating organic waste water with activated sludge, and still more particularly, to a novel method for biochemically treating organic waste water in two stages using two aeration tanks which are different in type.

Description of the prior art

An activated sludge process is a commonly used name of a method for treating waste water by aerating said waste water in an aeration tank with activated sludge recycled from the final tank where said activated sludge is settled. This activated sludge method has been widely utilized by many manufacturing plants and factories in the treatment of the waste water produced therein. Depending on the phase of the waste water to be treated, however, the activated sludge introduced into the waste water often developed a condition commonly called "bulking" which caused a great deal of difficulty in the separation of the activated sludge in the final settling tank, and resulted in a substantial impairment of the entire operation. The settlement of the activated sludge in a bulking state in the final settling tank required that the concentration of the mixed liquor suspended solids (MLSS) in the aeration tank be maintained at a low level. However, an operation performed under a low concentration of the activated sludge in the aeration tank naturally led to a reduction in the treatment efficiency per unit capacity of the aeration tank.

Another conventional treatment of waste water relied on the "fixed activated sludge process." According to this process, aeration of waste water containing activated sludge was conducted in an aeration tank packed with layers of nets so as to have the activated sludge caught by the nets and retained thereon. While this latter method is suited for treating the sewage in cities because of the phase of such waste water which does not require the use of activated sludge in aerating the sewage, it is not suited for the treatment of such waste water produced from, for example, chemical plants as will cause bulking of the activated sludge which is used in the treatment, because of the low velocity of the removal of BOD loading and because of the fact that, accordingly, the portion of the sludge detached from the layers of packings is contained in the treated liquid collected which presents an undesirably muddy and unclear appearance.

SUMMARY OF THE INVENTION

It is the object of the present invention to eliminate the bulking of activated sludge during the treatment of waste water having a phase susceptible to cause such bulking of sludge without a sacrifice of the efficiency of the operation, by the combined use of the aforesaid fixed activated sludge process and the usual activated sludge process. Biochemically, the micro-organisms present in the stage of the operation conducted by the fixed activated sludge process are different in phase from those present in the stage of the operation performed according to the usual activated sludge process. Therefore, by combining these two processes in the treatment of waste water of the type described, the treatment of the waste water can be performed in conformity with the different phases of the waste water, so that, as a result, the BOD loading can be reduced efficiently.

BRIEF DESCRIPTION OF THE DRAWING

The drawing is a flow sheet showing one embodiment of the present invention.

In the drawing, reference numeral 1 represents an aeration tank for use in the fixed activated sludge process. Numeral 2 represents an intermediate settling tank. Numeral 3 represents an aeration tank used in the usual activated sludge process. Numeral 4 represents a settling tank. The aeration tank 1 for the fixed activated sludge process comprises a plurality of layers 5 of packings consisting of nets (which, in the example given in the latter part of the specification, are those made of a plastic material having 1 cm. mesh), and an air-distributing pipe 6 provided in the space in the tank 1 apart from the layers 5 of nets. The raw feed is introduced through a raw feed supply pipe 7, and this raw feed is circulated in the tank 1 while being aerated by the air which is diffused in the waste water through the air-distributing pipe 6. The sludge thus activated by the aeration is caused by the current of the circulated liquid to be caught in by the layers 5 of nets and adheres thereto where it grows into fixed activated sludge. The organic substances contained in the raw feed are then captivated or digested by the fixed activated sludge and the organic substances are aerobically dealt with by the action of the micro-organisms contained in the sludge.

A part of the treated liquid contained in the aeration tank 1 for the fixed activated sludge process is then led to the intermediate settling tank 2 where it is left unstirred. After the solid matter has settled onto the bottom of this tank 2, the liquid thus separated from the solid matter is transferred to the aeration tank 3 for the usual activated sludge process. In this aeration tank 3, the liquid is mixed further with the activated sludge returned through a sludge-returning pipe 8 from the final settling tank 4 after being separated therefrom, and the resulting mixture is brought into contact again with the air introduced therein through an air-distributing pipe 9 to further reduce the BOD loading. A part of the liquid contained in the aeration tank 3 is drained into the final settling tank 4 where it is separated from the activated sludge and the resulting purified liquid is discharged therefrom.

The duration of stay of the liquid in the aeration tank 1 for the fixed activated sludge process and the length of its stay in the aeration tank 3 for the usual activated sludge process are in the order of eight hours, respectively. This length of time should be controlled in accordance with the magnitude of the BOD loading. The majority of the organic substances contained in the raw feed is first decomposed in the aeration tank 1 for the fixed activated sludge process, and then, the treated liquid is substantially separated, in the intermediate settling tank 2, from the detached sludge transferred thereto with the liquid from the first aeration tank 1, and thereafter, the residual organic substances are removed in the aeration tank 3 for the usual activated sludge process. The micro-organisms contained in the sludge located in the aeration tank 1 for the fixed activated sludge process are of a phase which is different from the phase of those contained in the sludge located in the aeration tank 3 for the usual activated sludge process. Therefore, no satisfactory result from aeration is obtained from a mere prolongation of the stay of contents in either of the aeration tanks 1 and 3, or from the mere aeration utilizing two aeration tanks of similar type coupled together. An effective result of aeration is obtained only by the use, in combination, of said two different types of aeration tanks, namely, an aeration tank 1 for the fixed activated sludge process and another aeration tank 3 for the usual activated sludge process.

It is to be noted, however, that in case aeration in the tank 1 for the fixed activated sludge process is conducted with the air introduced from below through an air-distributing pipe 6 provided below the layers 5 of packings covering the entire area in the tank 1, there will occur an undesirable increase in the quantity of sludge which is urged to detach from the layers of packings by the pressure force of the air distributed thereto. It is desirous, therefore, that a space be provided in the tank at a site adjacent to the area where the layers of nets are installed and that an air-distributing pipe be provided in such space in the tank as shown in the drawing. Also, it is not necessary to completely remove sludge in the intermediate tank 2, and accordingly, this intermediate tank 2 may be substituted by a rotary screen or like device.

DESCRIPTION OF THE PREFERRED EMBODIMENT

The present invention will be described in further detail in connection with a preferred embodiment.

Example: Using a treating apparatus comprising an aeration tank having a capacity of 10 liters for the usual activated sludge process and a final settling tank 4 having a capacity of 5 liters, waste water discharged from a chemical plant and consisting principally of acetaldehyde and having a BOD-5 loading of from 350 to 400 p.p.m. and a COD ranging between 440 and 550 p.p.m. was supplied to the aeration tank 3 and therefrom to the final settling tank 4, while supplying activated sludge recycled through a sludge-returning pipe 8. While introducing air into the tank 3 through an air-distributing pipe 9, treatment of the waste water with activated sludge was conducted. The stay of the liquid in the aeration tank 3 lasted for eight hours, and the concentration of the mixed liquor suspended solids (MLSS) was held at a level of about 2500 p.p.m.

The quality of the treated liquid and the sludge volume index (the ratio of the weight of the settled sludge after the liquid was left unstirred for 30 minutes to the weight of the substances suspended in the liquid mixed with sludge) are shown in the following Table I.

TABLE I

| Duration of Operation (days) | Treated Water | | Concentration of sludge in aeration tank (p.p.m.) | Sludge Volume Index |
|---|---|---|---|---|
| | COD (p.p.m.) | BOD (p.p.m.) | | |
| 1 | 130 | 8 | 2,530 | 83 |
| 2 | | 12 | | |
| 3 | 158 | | 2,580 | 97 |
| 4 | | 7 | | |
| 5 | | 9 | | |
| 6 | 117 | 13 | 2,360 | 84 |
| 7 | | 5 | 2,360 | 106 |
| 8 | 87 | 7 | | |
| 9 | | 5 | 2,280 | 120 |
| 12 | 187 | 28 | 2,540 | 153 |
| 14 | 78 | 5 | 2,870 | 172 |
| 16 | 70 | 4 | 3,040 | 181 |

As is clearly understood from Table I, there was noted a gradual increase in the value of SVI (sludge volume index) with the lapse of time accompanied by the bulking of sludge, and the settlement of the sludge became impossible after the 20th day, resulting in a complete impairment of the operation.

In contrast to the foregoing system, an aeration tank 1 for the fixed activated sludge process having a capacity of 10 liters and an intermediate settling tank 2 having a capacity of 5 liters were connected to the aeration tank 3 on the side prior to the aeration tank 3. A continuous treatment on eight-hour stay basis for each of the tanks was performed. With this arrangement, it was possible to continue the operation consecutively for two months without the occurrence of any disorder at all. The quality of the treated waste water was that the BOD-5 loading was in the range between 5 and 12 p.p.m. and COD ranged between 70 and 100, with SVI ranging between 110 and 130. It was also noted that the sludge settled in the intermediate tank was such that 90% or more of it could be collected by the use of a sieve having 100 to 150 meshes, and it was found that the intermediate tank could be substituted by a rotary screen or like device.

In case the treatment of waste water was conducted in two stages by the use of combined two aeration tanks similar in type and without an aeration tank for the fixed activated sludge process affixed to said aeration tanks on the side prior thereto, the problem of the bulking of sludge could not be solved. Also, the mere prolongation of the stay of the contents in the aeration tank 3 for the usual activated sludge process did not lead to an increase in the velocity of removal of BOD loading. In order to obtain a reduction of BOD loading of an extent similar to that obtained according to the method of the present invention, it was necessary to continue the stay for about 25 hours. Even from this prolonged stay, the problem of bulking was not solved as desired. Furthermore, in case aeration was conducted in two stages by the use of two combined aeration tanks 1 for the fixed activated sludge process, it was impossible to eliminate the muddy appearance of the treated liquid, and the BOD-5 loading of the treated water was in the range between 50 and 70 p.p.m.

As has been discussed, by introducing an aeration tank 1 for the fixed activated sludge process in the stage prior to the aeration tank 3 for the usual activated sludge process, it is possible to decompose substantially all of the substances which cause bulking of the activated sludge use, and the decomposed substances are supplied, in the form of intermediary products, to the aeration tank 3 for the usual activated sludge process. Thus, bulking of the sludge can be avoided and at the same time, the BOD loading in the aeration tank 3 can be reduced, with the result that the entire treatment efficiency is enhanced.

It is to be understood that the foregoing example and embodiment have been described and illustrated simply by way of example and that they are not restricted The embodiments of the invention in which an exclusive property or privilege is claimed are defined as follows:

1. A method for treating organic waste water using a first contact aeration tank which contains a multitude of net layers therein, an intermediate device for receiving effluent from the first aeration tank and separating sludge therefrom, a second, activated sludge aeration tank for receiving effluent from the intermediate device and a final settling tank for receiving effluent from the second aeration tank, comprising the steps of feeding the organic waste water into the first aeration tank while simultaneously preventing discharge of the contents of said second aeration tank and said final settling tank into said first aeration tank and simultaneously introducing air into said first aeration tank to cause circulation of the organic waste water through said first aeration tank and to cause an activated sludge of a first character to adhere to said net layers to form a fixed bed of activated sludge on said net layers for digesting the organic substances contained in the organic waste water and to reduce the BOD demand thereof; aerating the effluent entering the second aeration tank and simultaneously returning a portion of the activated sludge from the final settling tank to said second aeration tank to form in said second aeration tank an activated sludge of a second character different from the activated sludge in the first aeration tank, the activated sludge in said second aeration tank being circulated through the second aeration tank; whereby the sludge volume in the second aeration tank is minimized.

2. A method according to claim 1, in which the nets are made of plastic fibers.

3. A method according to claim 1, in which the net layers occupy only a portion of the cross section of the first aeration tank and the remainder of said cross section defines an essentially unobstructed space so that the organic waste water can freely move therethrough, including the step of directing the air introduced into said first aeration tank toward said space so that the tendency of said air to dislodge sludge from said net layers is minimized.

References Cited

UNITED STATES PATENTS 1,893,623  1/1933  Imhoff _____ 210—195

OTHER REFERENCES

Metcalf, L., et al.: American Sewerage Practice, vol. III, Disposal of Sewage, third edition, 1935, pp. 467–476.

MICHAEL E. ROGERS, *Primary Examiner.*